US006667826B1

(12) United States Patent
Hartley et al.

(10) Patent No.: US 6,667,826 B1
(45) Date of Patent: Dec. 23, 2003

(54) CHROMATIC MODULATOR FOR HIGH RESOLUTION CCD OR APS DEVICES

(75) Inventors: Frank T. Hartley, Arcadia, CA (US); Anthony B. Hull, Long Beach, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 80 days.

(21) Appl. No.: 10/087,683

(22) Filed: Mar. 1, 2002

(51) Int. Cl.[7] .............................. G02F 1/23; G09G 5/00; H04N 5/335; H04N 9/04; H04N 9/083
(52) U.S. Cl. ..................... 359/278; 345/207; 348/273; 348/277
(58) Field of Search .................... 359/245, 254, 359/278, 259, 282, 308; 345/204, 207, 30, 32, 55, 84, 85; 348/273, 277

(56) References Cited

U.S. PATENT DOCUMENTS

| 4,329,588 | A |   | 5/1982  | Barrett et al. ............ 250/445 T |
|-----------|---|---|---------|--------------------------------------|
| 4,331,877 | A |   | 5/1982  | Barrett et al. ............ 250/445 T |
| 4,460,259 | A |   | 7/1984  | Greivenkamp, Jr. et al. ..... 354/403 |
| 4,575,193 | A | * | 3/1986  | Greivenkamp, Jr. ........ 359/495 |
| 4,791,584 | A |   | 12/1988 | Greivenkamp, Jr. ........ 364/525 |
| 4,794,550 | A |   | 12/1988 | Greivenkamp, Jr. ........ 364/562 |
| 4,987,496 | A |   | 1/1991  | Greivenkamp, Jr. ........ 358/448 |
| 4,988,886 | A |   | 1/1991  | Palum et al. ............... 250/561 |
| 5,075,560 | A |   | 12/1991 | Greivenkamp, Jr. et al. ..... 250/561 |
| 5,075,562 | A |   | 12/1991 | Greivenkamp, Jr. et al. ..... 250/561 |
| 5,943,033 | A | * | 8/1999  | Sugahara et al. ............. 345/85 |
| 6,292,212 | B1 | * | 9/2001 | Zigadlo et al. .............. 348/33 |

OTHER PUBLICATIONS

Web article entitled, Rockwell's CMOS Imaging Ics for Digital Still and Video Cameras, Copyright © 1998–1999 Conexant Systems, Inc., http://www.conexant.com/cnxt/news_events/pats/CMOS_white_paper, 13 pps.

* cited by examiner

*Primary Examiner*—Hung Xuan Dang
*Assistant Examiner*—Joseph Martinez
(74) *Attorney, Agent, or Firm*—John H. Kusmiss

(57) ABSTRACT

A system for providing high-resolution color separation in electronic imaging. Comb drives controllably oscillate a red-green-blue (RGB) color strip filter system (or otherwise) over an electronic imaging system such as a charge-coupled device (CCD) or active pixel sensor (APS). The color filter is modulated over the imaging array at a rate three or more times the frame rate of the imaging array. In so doing, the underlying active imaging elements are then able to detect separate color-separated images, which are then combined to provide a color-accurate frame which is then recorded as the representation of the recorded image. High pixel resolution is maintained. Registration is obtained between the color strip filter and the underlying imaging array through the use of electrostatic comb drives in conjunction with a spring suspension system.

18 Claims, 5 Drawing Sheets

Portion of Strip & APS

CHROMATIC MODULATOR FOR HIGH RESOLUTION CCD OR APS DEVICES

STATEMENT AS TO RIGHTS TO INVENTIONS MADE UNDER FEDERALLY-SPONSORED RESEARCH AND DEVELOPMENT

The invention described herein was made in the performance of work under a NASA contract, and is subject to the provisions of Public Law 96-517 (35 USC 202) in which the contractor has elected not to retain title.

BACKGROUND OF THE INVENTION

1. Field of the Invention

This invention relates to image generation and more particularly to a color filter system for CCD or APS devices using Red-Green-Blue (RGB) color separation in order to provide color images.

2. Description of the Related Art

Traditionally, the Red-Green-Blue (RGB) separation of color in electronic imaging is done in a variety of ways. In one system, electronic imaging is performed by the use of fixed filters over three separate imagers. Problems sometimes arise with this configuration, as there may be some mis-registration between each of these three separate imagers. In fact, when multiple imagers are used, a high degree of registration between the separate imagers is required.

Another way to perform RGB color separation is to use time multiplexed filters imposed over a single imager. In this system, separate filters provide a series of time exposures to single imagers. The resulting separate images are combined to provide a resulting color image. Lastly, another method by which to achieve RGB color separation is with the use of three colored (or four pixel blocks for symmetry) arrays of pixel sized filters covering a single imager.

Each of these prior ways of achieving RGB color separation has its drawbacks. With the separate imagers, the optics is complicated and, as mentioned previously, high registration requirements are imposed upon the system in order to ensure clarity of the ultimate image. With the other systems, filter wheels are expensive and any camera using such a system is bulky and more unwieldy than if the filter wheels were absent. Using a fixed pixilated color filter generally reduces the resolution of the ultimate image by reducing its pixel density. Additionally, color aliasing is inadvertently introduced which produces disturbing or distracting images in patterned scenes or scenes where high contrast lines are in motion across the field of view.

Consequently, it can be seen that the art still demands, and looks for, an RGB color separation system that overcomes the drawbacks of the prior art.

SUMMARY OF THE INVENTION

The present invention realizes an efficient, lightweight, and robust means by which RGB encoding of image data without loss of pixel resolution is achieved.

The present invention provides a system for providing high-resolution color separation in electronic imaging. A Red-Green-Blue (RGB) color strip filter system (or otherwise) is used over an electronic imaging system such as a charge-coupled device (CCD) or active pixel sensor (APS). The color filter is generally modulated over the imaging array at a rate four times the frame rate of the imaging array. In so doing, the underlying imaging elements are then able to detect four separate color-separated images which are then combined to provide a color-accurate frame which is then recorded as the representation of the recorded image. High pixel resolution is maintained. Registration is obtained between the color strip filter and the underlying imaging array through the use of electrostatic comb drives in conjunction with a spring suspension system. The spring suspension system aligns the color strip filter (which is held by a frame) over the imaging array in the first and neutral position. The frame with the color strip filter is then snapped to an up position, and then to a down position before returning to the neutral position. In this way, a cycle is presented over the imaging array so that each individual color filter is presented to an underlying image sensor element one time for each frame of the entire imaging array. In-situ encoding of the filter rows is made by overlays or otherwise that may only be necessary on a few of the rows in order to preserve the image and reduce the pixel losses due to such overlays.

A micro-machined (MEMS—Micro Electro Mechanical Systems) modulator of an RGB strip filter provides the results currently lacking in the art. None of the above-mentioned shortcomings are present in the chromatic modulator of the present invention. Such drawbacks are avoided, as the various color strips used are generally the width of and register with the active pixel area. They also generally match the width of the intermediate dead space. The color strips are moved back and forth over the optical imaging area a distance that equals the width of the filters and at a rate that generally matches the number of filters, namely four times the frame rate of the imager. In so doing, chroma modulation is achieved for all pixels of an imaging array whether a charge-coupled device (CCD) or active pixel sensor (APS). The chromatic modulator of the present invention may be used in camera recorders, or camcorders, digital cameras, APS color filters, and the like. Generally, optical recording equipment implementing the present invention might be brought to market relatively quickly.

OBJECTS OF THE INVENTION

It is an object of the present invention to provide better color imaging for optical recorders such as cameras.

It is yet another object of the present invention to provide better RGB color separation and electronic imaging.

It is yet another object of the present invention to provide better color imaging in a manner that maintains image resolution.

It is yet another object of the present invention to provide a filter exposure density greater than two.

It is yet another object of the present invention to provide high-resolution color imaging in a commercially-achievable manner.

These and other objects and advantages of the present invention will be apparent from a review of the following specification and accompanying drawings.

BRIEF DESCRIPTION OF THE DRAWINGS

FIG. 1 is not to scale.

DESCRIPTION OF THE PREFERRED EMBODIMENT(S)

The detailed description set forth below in connection with the appended drawings is intended as a description of presently preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
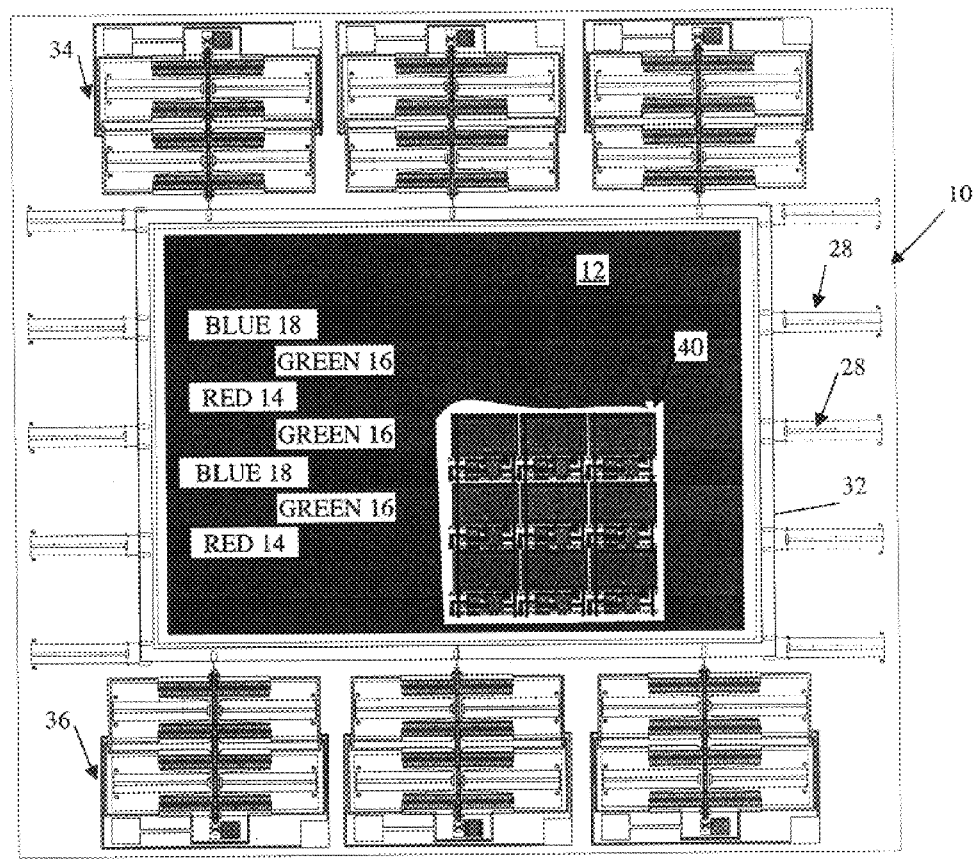
FIG. 1 is a plan view of a framework for holding the RGB strip filter of the present invention. Shown in cutaway view is the underlying image array beneath the RGB strip filter.
Figure 4:
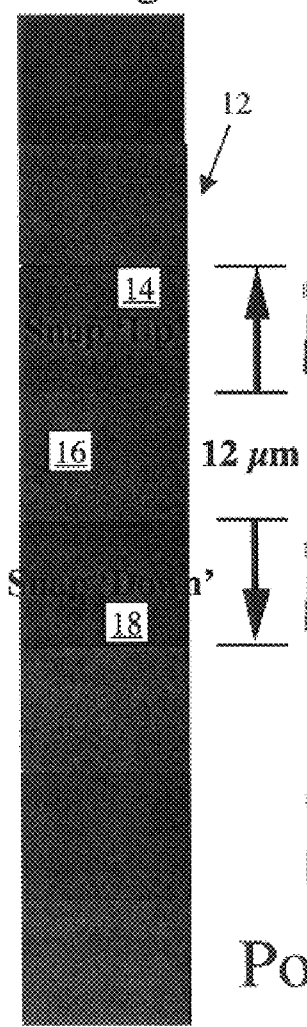
FIG. 4 is an example of the RGB strip filter of the present invention showing the repeated series of three-color strips.
Figure 5:
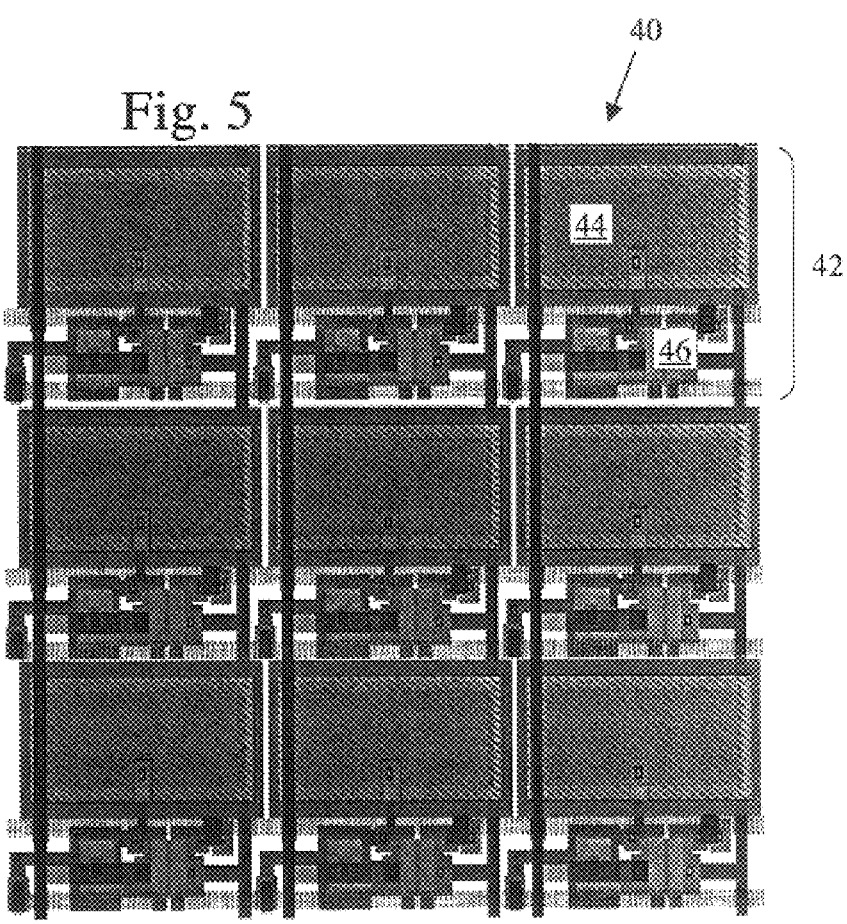
FIG. 5 is a plan view of an APS array.
Figure 6:
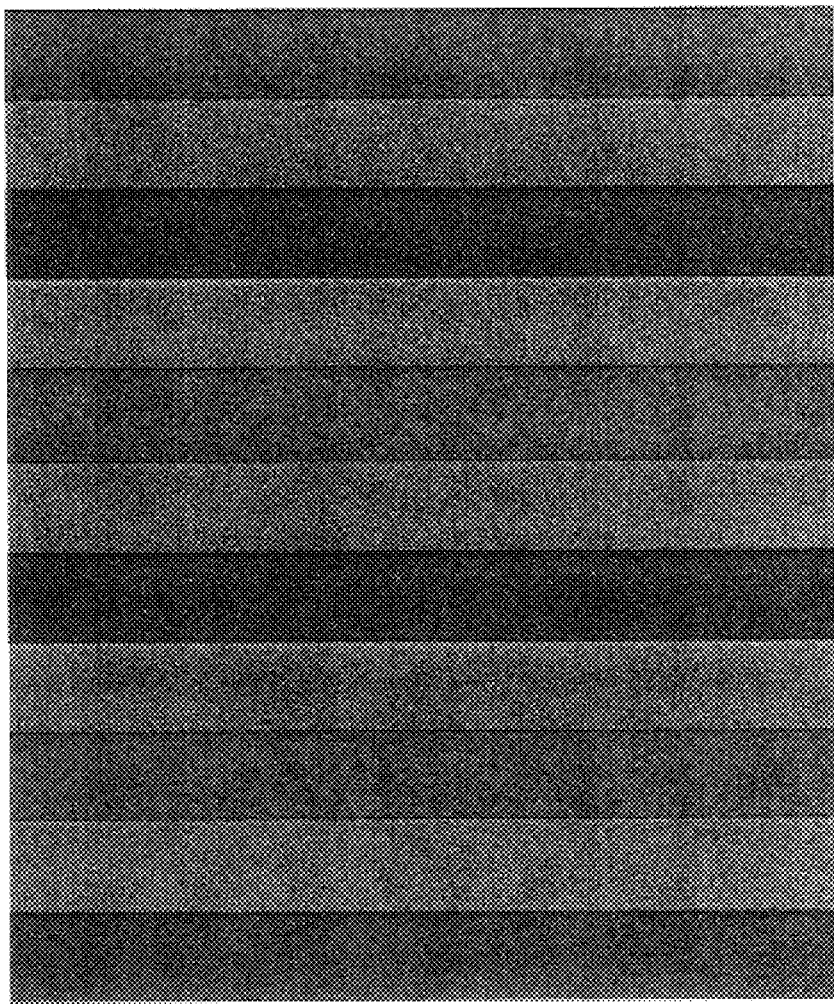
FIG. 6 is a plan view of an enlarged embodiment of the RGB strip filter shown in FIG. 4.

As shown in FIGS. 1, 4, and 6, a primary element of the present invention is a strip filter 12 having strip filters of different colors, namely red 14, green 16, and blue 18. FIG. 4 represents only a small portion of an overall strip filter that would be superimposed over an imaging array 40 such as an CCD or APS device. Such CCD and APS devices are known in the art. The imaging array 40 shown in FIG. 5 is an APS device. The imaging array 40 shown has individual pixels or imaging elements 42 having an active imaging area 44 and an electronic support area 46. As shown in FIG. 5, the upper half of the pixel 42 is taken up by the active imaging area 44 while the electronic support area 46 generally takes up the lower half of the pixel. While this is a convenient arrangement for the present invention (as it allows a horizontal or linear geometry for the strip filter 12), other arrangements may also be advantageously implement in adherence to the present invention.

In one embodiment of the present invention, the width of the individual strips in the color filter 12 generally match the corresponding width of the active imaging area 44 for each of the pixels 42. Each of the color strips in the filter 12 shown in FIGS. 1, 4, and 6 are the same width (or sufficiently the same width) as the sensitive area 44 of a row of pixels or imaging elements in the underlying imaging array 40. Generally, this is half the width of the underlying imaging array. As indicated in the drawing, this width is on the order of 10–12 microns (10–12 micrometers), but may change with specific applications. Each of the filters is able to filter a different color of light so that the active optical elements 44 underneath are able to detect a specific segment of the visible (RGB) spectrum and then use the data collected during superposition of the filtered image in order to reconstitute a fully colorized image.

In order to achieve this, the RGB strip filter 12 is modulated, or shifted, over the imaging array 40. In one embodiment of the invention, such modulation occurs three or four times for every single frame or image capture effected by the imaging array 40. In so doing, each frame is then composed of a combination of each of the three or four color filter images received by each of the imaging elements 42 in the imaging array 40. The resulting frame then is fully colorized according to the combination or the individual color elements collected by the imaging array 40 and at a frequency that generally matches the spectral sensitivity of the human eye.

Imaging elements 42, such as those shown in FIG. 5, of an imaging array 40 are generally very small in order to effect a high resolution. The imaging elements 42 may be those of CCD or APS imaging elements. The greater number of imaging elements per unit area provides for higher image resolution. In order for there to be clarity and integrity of the recorded image as compared to the actual item captured by the imaging system, a high degree of registration, or alignment, is necessary between the RGB strip filter 12 and the underlying image array 40. The frame system 10 shown in FIG. 1 provides for the controlled operation of the RGB strip filter 12 in conjunction with the precision required for the underlying imaging system.

Figure 2:
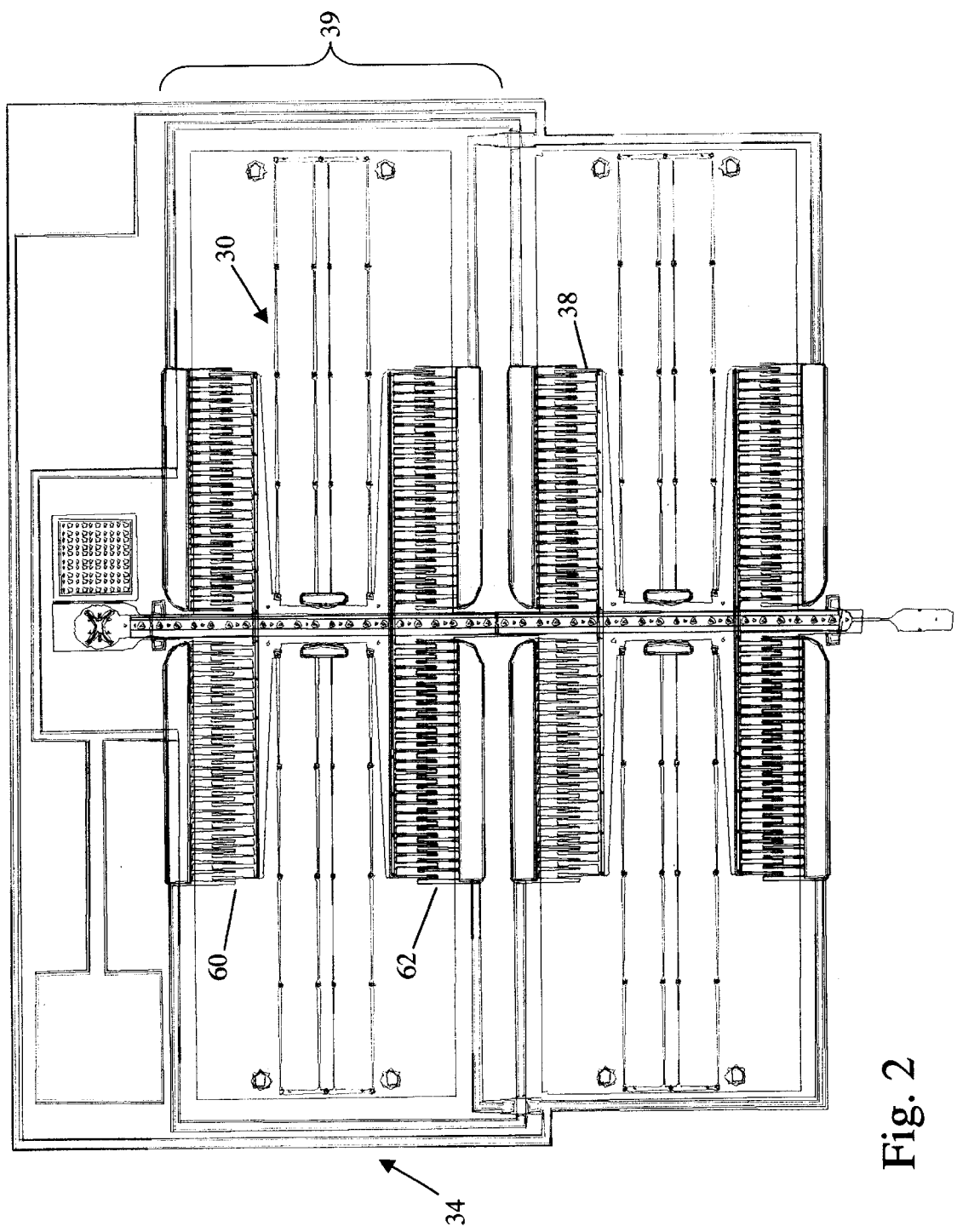
FIG. 2 is an enlarged view of a single comb drive array used in the framework shown in FIG. 1.

FIG. 1 shows one example of an electrostatic comb drive and spring-suspension module system. FIG. 2 shows an enlarged single electrostatic comb drive unit 34 as seen in FIG. 1. The use of comb drives is relatively well known in the art, as are spring suspension systems. Comb drive units are known in the art and provide means by which high-frequency lateral movement may be imposed on a structure such as the RGB strip filter 12. In a comb drive, interlacing comb fingers create a large capacitor area. Relative motion between the comb fingers is controlled and actuated electrostatically. As shown in FIG. 1, the RGB strip 12 is suspended over the imaging array 40. The imaging array 40 is shown in cutaway view in FIG. 1 beneath to the RGB strip 12. The frame springs 28 circumscribing the frame 32 serve to both retain the frame 32 (and its RGB strip filter 12) at a central location and suspended above the imaging array 40 and to restore the frame 32 to a default position.

As shown in FIG. 2, each comb drive 34 generally has four (4) pairs, or sets, of individual comb drives generally indicated by 38. These four sets of comb drives 38 are grouped into two pairs, each having two comb-drive springs 30 associated with them. The comb-drive springs 30 are oppositely opposed between the pairs of drive sets as shown in FIG. 2.

Referring to FIGS. 1 and 2, this disposition of the individual comb drives 38 serves to establish pairs of oppositely opposing individual comb drives 38 on either side of the comb-drive springs 30. Each of the comb pairs and springs combination 39 operates to allow the upper comb drive 60 (as seen in FIG. 2) to pull upwardly while the lower drive 62 pulls downwardly. The comb-drive spring 30 restores the associated comb drives 38 to their neutral, or default, position. The outer combs with respect to the comb-drive springs 30 generally remain stationary while the inner comb elements adjacent the comb-drive springs 30 move with respect to the stationary comb elements. The attached frame 32 (as seen in FIG. 1) is then subject to the movements of the comb drives 38 along with the restoring force of the comb-drive springs 30 to provide a system with three positions: the neutral position to which the frame 32 is also restored by the frame springs 28, an upward position, and a downward position. In a coordinated fashion, the upper 34 and lower 36 comb drives operate together to move the frame 32 up and down.

Referring now to FIG. 2, the comb drive 34 uses sets of comb-drive springs 30 in conjunction with the four pairs of individual comb drive elements 38 that are similar to the side frame springs 28 shown in FIG. 1. By using the same type of springs with generally the same displacement in the individual comb drives 34, 36 as for the frame system 10, the displacement to of the individual comb drives 34, 36 generally matches that of the frame 32. Additionally, manufacture of the frame springs 28 and comb-drive springs 30 becomes a simpler task as the same general structure is used for both springs. In a currently-preferred embodiment, the comb-drive frame springs 28 used in the comb drives 34 may have a slightly larger displacement than those used with the frame. Any contact between spring elements (such as between the buffer stops 50 and the contact pads 56) then occurs first with the frame springs 28.

Figure 3:
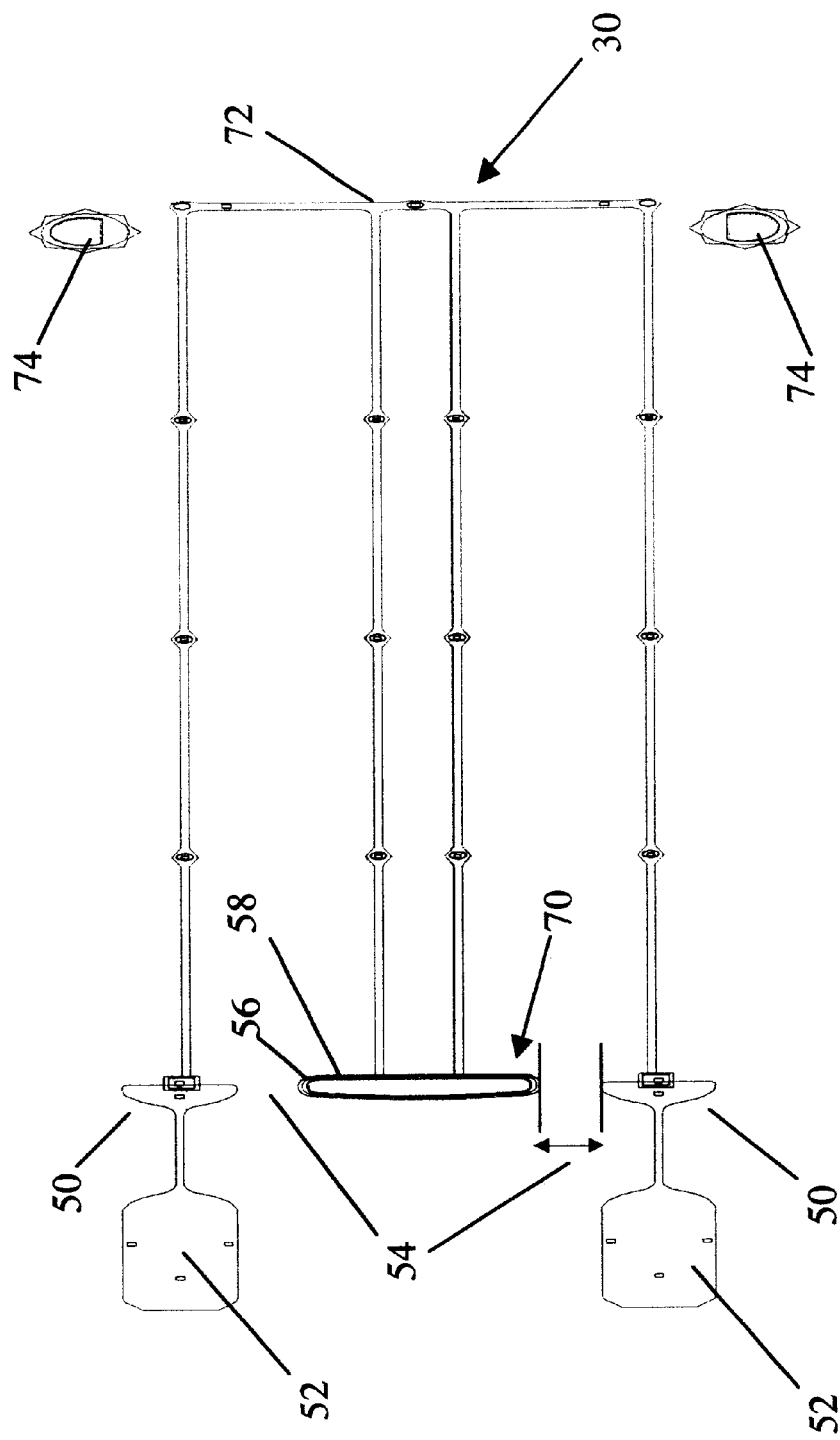
FIG. 3 is a top plan view of a spring used in the framework in FIG. 1 and the comb drive of FIG. 2 with buffer stops and spring stops used to control the excursions experienced by the RGB strip filter and comb drive elements used in the present invention.

As shown in FIG. 3, each of the comb-drive springs 30 has buffer stops 50 positioned on mount anchors 52. The buffer stops 50 set the excursion, or travel, limits for the frame 32 when the upper 34 and lower 36 banks of electrostatic comb drives are coordinatingly activated. A 10–20 microns separation 54 between the buffer stops 50 and contact pads 56 (on spring bumpers 58) is equal in width or slightly greater in width than a single color strip (14, 16, 18). Additionally, this approximately 15 micrometer (15 μm) distance can also match or be matched to the width of the pixel area or the width of active elements 44 in the imaging array 40.

The mount anchors 52 provide the attachment points to which the inner comb drive elements are attached. The inner comb drive elements are biased and restored to a default position by the comb drive springs 30 once the associated comb drives 60, 62 are deactivated.

In FIG. 3, the spring 30 is shown and is attached to a substrate by an attachment pillar 70 or other similar structure. As FIG. 3 shows only a two-dimensional overhead view, the upright nature of the attachment pillar is not shown, but lies beneath the spring bumper 58. The attachment pillar 70 is generally the sole point of attachment for the spring 30. The opposite end 72 is free to laterally articulate between the two spring stops 74. The mount anchors 52 are able to more freely travel laterally due to the relatively lengthy distance between the mount anchors 52 and the attachment pillar 70. As can be readily seen, the mount anchors 52 are attached a distance approximately twice that of the length of the spring 30 away from the attachment pillar 70. Any forces present on the mount anchors 52 must first travel down to the end 72 opposite that of the attachment pillar 70 before actually reaching the attachment pillar 70. Consequently, any stress impressed upon the spring 30 is distributed over a much greater distance and substantially more of the actual structure of the spring 30 than that distance which is merely between mount anchors 52 and the attachment pillar 70.

The spring stops 74 serve to also protect the spring 30. Should a mount anchor 52 be pulled far from its rest position (FIG. 3) then the end 72 opposite the attachment pillar 70 will only be displaced so far as the associated spring stop 74 will allow. This prevents greater damage to the spring 30 should the pulled mount anchor 52 inflict catastrophic stress on the spring such that the mount anchor 52 detaches from the spring 30. Although some of the spring 30 may detach with the mount anchor 52, the predominant portion of the spring 30 will remain intact as the spring 30 cannot be displaced farther than the spring stop 74.

The frame springs 28 are generally the same as, and may be identical or almost identical to the comb-drive springs 30. Both the frame springs 28 and the comb-drive springs 30 may be made of polysilicon, lending their construction to MEMS processes and to useful operation despite the repetitive flexing imposed by the oscillating frame 32.

As best shown in FIGS. 1, 4, and 5, each active imaging element, or active pixel element, 44 forms an active imaging row with its neighbors. These rows are matched with the filter strips 14, 16, 18 when the strip filter 12 is shifted by the frame 32. Consequently, each row of active pixel elements 44 is simultaneously subject to the same color filter strip provided by the strip filter 12. In one embodiment, all active pixel elements 44 are subject to the same color while in other embodiments, each row may be subject to different colors.

This displacement is diagrammatically represented in FIG. 4, and note should be taken that when the RGB strip filter 12 is horizontally aligned with the shuttle frame 32, it is likewise co-aligned with the image array's imaging elements. As all components of the chromatic modulator of the present invention are precisely machined and as the comb-drive elements 34, 36 can precisely position the frame over the imaging array 40, once registration between the RGB strip 12 and the imaging array 40 is achieved, it is generally easily maintained. An adjustment for the frame 32 may be used to provide for such registration.

Once the apparatus has been constructed (and such construction may be in the form of a self-assembling micromachining process to produce the chromatic modulator of the present invention), each resulting image frame is generally a combined "snap shot" of four different color images, one for each color strip in the RGB filter 12 (red 14, green 16, and blue 18) plus an additional green 16 image. When the imager 40 is scanned at four times the frame rate and the filter 12 is moved relative to imaging array 40 in conjunction with the same four-times scanning rate, four separate color encoded data images are collected by each underlying imaging area 44 at full pixel resolution for the entire imaging array 40. Each of these four separate color encoded data images may then be combined in order to achieve a full color image for a single frame of visual data. For digital video, this process is repeated continuously in a manner to match or exceed the rate of video frame presentation.

In a preferred embodiment, two green-filtered frames may be gathered for each red and blue frame. Such a configuration is commonly used to provide attractive color video signals that are better accepted and appear truer to the human eye. An additional green frame provides the needed color balance. The RGB strip 12 in FIGS. 1, 4, and 6 provides an easy way to achieve such green-biased video signals when each row in an imaging array 40 corresponds to a green filter row 16 adjacent a blue 18 and red 14 filter row.

When the filter 12 is snapped up, released to a neutral position, snapped down and released to a neutral position by the comb drives 34, 36, the three-state filter positioning results in twice as many green-filtered images as either red or blue images. In this embodiment, each row of the active elements 44 is spaced apart from its neighbors by the distance of a single filter row (FIGS. 4 and 5). Conveniently, the electronic supporting areas 46 may provide such spacing naturally.

Generally, the limits of resolution for the chromatic modulator of the present invention depend only on the imaging array resolution and comb-drive's temporal responsiveness. Generally, the RGB strip filter 12 can be as fine and thinly striped as possible as determined by the optically-active pixel area 44. The limits of visual resolution (pixels per square unit area; pixels/in$^2$; pixels/cm$^2$) are currently seen as depending on how small the imaging array rows can be made and/or the upper frequency limit of the comb drives 34, 36.

In an enhanced embodiment of the present invention, in-situ, or local, encoding of the actual color filter element covering each of the active area 44 rows during the scans simplifies the image processing and therefore the image-collecting process. One means of accomplishing this task is to encode the strip filters with opaque coatings. In one embodiment, the last two pixel columns of a selected strip color filter are made opaque with metal coatings. One implementation of such a system would be where red filter strips 14 have a metal coating overlay over the second to last (penultimate) pixel column, while the blue filter strips 16 have a metal coating overlay at the last pixel column. For the green strip filters 18, there can be either no metal coating overlays or metal coating overlays for both of the pixel columns. By detecting the presence of the overlays, identification of the particular color filter (composed of same-color strips) can be made immediately. One exception to this is when a totally black image is present that provides no contrast between the overlays covering part of the image array and those that are not covered by such overlays.

While there may be some pixel loss with respect to the overlay system set forth above, the pixel losses for this encoding are minor and are virtually zero if only a few rows are encoded rather than whole columns in the strip array. As all rows of the imaging array 40 are generally subject to the same color from the filter 12 at one time, providing a sensing area in just one row supplies the needed color information for all rows.

Depending upon the frame rate for the capture of images by the image array 40, the frame 32 with its RGB strip filter 12 may modulate at approximately 96–120 "snaps" per second. This corresponds, respectively, to 24–30 frames per second. Generally, this frame rate is sufficient for human beings, as it prevents the eye from seeing erratic or jerky motion in the recorded image.

While the present invention is readily adaptable to current standards of video gathering transmission at known frame rates, other significant advantages in the video signal gathering art are delivered by the present invention. For example, motion picture film is often presented at 24 frames per second (24 fps), while PAL/SECAM video signal uses a frame rate of 25 frames per second (25 fps). NTSC video uses a frame rate of 30 frames per second (30 fps). The present invention easily allows the gathering of video information for any one of these three video protocols. Depending upon the number of filtered images needed to produce a single color image, the comb drives 34, 36 would generally run at a "snap rate," or rate of changing the filter for each pixel row, three-to-four times that of the desired and ultimate frame rate, or presentation rate. However, the rate at which the chromatic modulator of the present invention gathers filtered images for a single color image is not necessarily limited to those known in the public or entertainment media. For example, in machine vision systems, frequency rates from 1,000 to 4,000 cycles per second (1kHz–4kHz) may be desired and obtained by the present invention.

The electrostatic comb drive system of the present invention can operate at a very high frequency. Generally, this is due to the strong and rapidly changeable nature of electrostatic charge as well as the low mass, or inertia, of the system. Consequently, driving the comb drives 34, 36 with an alternating signal at a kilohertz or megahertz (1,000 or 1,000,000 cycles per second) is not beyond the realm of the present invention. Additionally, as the distance is traveled by the comb drive and other elements of the present invention decreases with increased miniaturization, frequency regimes in the tens to the thousands of megahertz (one gigahertz) may be possible and easily realized in the future.

As the ultimate presentation frame rate of the present invention is generally one-third to one-fourth of the snap rate, presentation rates on the order of one-fourth of a gigahertz or 250 megahertz may be possible.

At such high frequency rates for the comb drive 34, 36 and the RGB filter strip 12, the underlying imaging array 40 must be able to gather the incoming light at a rate sufficient to deliver an adequate image. If the source of light is extremely bright (as would occur from a nuclear blast), the imaging array 40 may not need to be extremely sensitive. However, in gathering starlight from distant galaxies, the imaging array 40 would advantageously be as sensitive as possible in order to gather as much incoming light as possible.

Additionally, the imaging array need not be dedicated to the visible regime of the electromagnetic spectrum. "Images" in the x-ray, gamma ray, infra-red, or even microwave regimes could be captured by adapting the present invention. The color filter 12 then becomes a frequency transmitter/filter for selected light-frequency ranges. The imaging array 40 then becomes one sensitive to the frequency regimes of interest.

With such high frame rates and dynamic response, the nature of combustion, the sequence of events in an explosion, the flight mechanics of hummingbirds, and other rapidly-occurring events could foreseeably be recorded by a camera implementing the present invention. Other high-speed or changeable speed applications will occur to those of ordinary skill in the art as the need arises.

Note should be taken that the RGB filter strip 12 is not necessarily limited to the embodiment described herein. The RGB filter strip 12 may be changed according to the applications involved. Additionally, should liquid crystal display or other technology provide, each of the filter strips may be changeable in its color according to the desires of the person taking the images. However, under such circumstances, it may be that a colored liquid crystal display may operate on its own to provide the necessary frame rates with each of the filters changing as if they were snapped back and forth by the comb drives 34, 36. However, the rate of a color change in a filter may not sufficiently exceed or match that of the comb drives with their snapping action. In such a case, an additional level of adjustability is provided by having the comb drive-driven chromatic modulator of the present invention coupled with color adjustable filter strips.

The present invention overcomes difficulties present in the prior art. In some applications, pixel densities have been increased so that color filtering may be achieved by the pixels themselves. In such a situation, pixel clusters have individual pixels allocated to different colors in order to deliver the ultimate image. However, due to displacement requirements, this generally leads to a diminishment or reduction of ultimate video signal resolution.

As the present invention provides adjustability without constraint to any particular color ratio, provides adaptability to any pixel density, avoids the prior art problems of having a fixed filter with alignment problems or fixed color patterns on a single imager with dedicated color ratios, and as high-speed events such as the filming of a hummingbird, a fast conveyor belt, a fruit sorter, or rotating equipment are achieved by the present invention, advantages heretofore not seen in the art are provided by the present invention. Additionally, the present invention provides means by which machine imaging or robotic imaging can be achieved. Images may be gathered by the chromatic modulator of the present invention and used by robotic or machine recognition methods, software or otherwise. Also, the present invention provides for operation at arbitrarily high frame rates.

Significant attributes of this image generation and color filter system of the present invention include three APS device performance by temporal "times four" ("×4") multiplexing with the color filter. The Nyquist frequency is increased by a factor of four, diminishing spatial aliasing. The use of a crystalline quartz birefringent blur filter increases the horizontal blur filter duty cycle such that G=1. No "Bayer" interpolation is required, therefore eliminating the need for chromic aliasing, spatial chromic multiplexing, vertical "blur" filtering, and defocus capabilities. Also, achromatic compensation compromises are eliminated.

Certain special applications may be achieved by the present invention including low light applications, changing of the filter strip's 12 color ratios as the system operates ("on the fly"), dynamically changing the colors of the color strip 12 as the system operates, and the like.

While the present invention has been described with regards to particular embodiments, it is recognized that additional variations of the present invention may be devised without departing from the inventive concept of the present invention.

What is claimed is:

1. A light-frequency modulator system for providing frequency regime, or color, separation in an imaging array, comprising:
   an imaging array having active imaging elements arranged in a first geometrical pattern;
   a light-frequency strip filter, said light-frequency strip filter having filter elements arranged in correspondence with said first geometrical pattern; and
   a modulator, said modulator modulating said light-frequency strip filter between said imaging array and an image to be imaged, said modulator modulating said light-frequency strip filter according to a sequence; whereby
   light transmitted to said active imaging elements is filtered by said light-frequency strip filter according to said modulator sequence to effect a light-frequency image by said imaging array.

2. A light-frequency modulator system as set forth in claim 1, wherein said imaging array is selected from the group consisting of:
   charge-coupled devices (CCDs) and active pixel sensors (APSs).

3. A light-frequency modulator system as set forth in claim 1, wherein said first geometrical pattern is selected from the group consisting of:
   rows, lines, and columns.

4. A light-frequency modulator system as set forth in claim 1, wherein said light-frequency strip filter further comprises:
   a color strip filter, said color strip filter having filter elements arranged in correspondence with said first geometrical pattern.

5. A light-frequency modulator system as set forth in claim 4, wherein said color strip filter is a red-green-blue (RGB) strip filter.

6. A light-frequency modulator system as set forth in claim 5, wherein said filter elements of said red-green-blue (RGB) strip filter are strips of green filter adjacent strips of red filter and strips of blue filter, said strips being in width the same as a width of said active imaging elements.

7. A light-frequency modulator system as set forth in claim 1, wherein:
   said modulator modulates said light-frequency strip filter to present each different type of light-frequency transmitted by said filter elements to an active imaging element during an interval during which said imaging array constructs a frame of imaging.

8. A light-frequency modulator system as set forth in claim 7, further comprising:
   said light-frequency strip filter including a red-green-blue (RGB) light-frequency strip filter.

9. A light-frequency modulator system as set forth in claim 1, wherein said modulator further comprises:
   first and second comb drive elements, said first and second comb drive elements coupled to a first end of said light-frequency strip filter such that said first and second comb drives operate in opposite directions;
   a spring suspension system, said spring suspension system coupled to a periphery of said light-frequency strip filter, said spring suspension system generally retaining said light-frequency strip filter in a central location subject to offset or excursion by said first and second comb drives.

10. A chromatic modulator system for providing color separation in a visual imaging array, comprising:
    a visual imaging array having active imaging elements arranged in rows having a visual element width, said visual imaging array selected from the group consisting of charge-coupled devices (CCDs) and active pixel sensors (APSs);
    a red-green-blue (RGB) color strip filter, said RGB strip filter having parallel strips of red, green, and blue filter elements arranged in rows corresponding with said rows of said visual imaging array, said RGB strip filter having strips of green filter adjacent strips of red filter and strips of blue filter, said strips being in width the same as said visual element width; and
    a modulator, said modulator modulating said RGB strip filter between said visual imaging array and an image to be imaged, said modulator having first and second comb drives, said first comb drive coupled to said RGB strip filter, said second comb drive coupled to said RGB strip filter so that said first and second comb drives operate in opposite directions, said modulator also having a spring suspension system, said spring suspension system coupled to a periphery of said RGB strip filter, said spring suspension system retaining said RGB strip filter in a central location subject to offset or excursion by said first and second comb drives;
    said modulator modulating said RGB strip filter four times as fast as a time interval in which said visual imaging array constructs a frame of visual imaging; whereby
    light transmitted to said active imaging elements is filtered by said RGB strip filter according to said modulator to effect a color image by said visual imaging array and to provide an efficient, lightweight and robust means of providing RGB encoding of imaged data with reduced loss of pixel resolution.

11. A modulated light filter system for providing light-frequency separation in an imaging array, comprising:
    a light-frequency strip filter, said light-frequency strip filter having filter elements arranged in correspondence with a first geometrical pattern present in the imaging array; and
    a modulator, said modulator modulating said strip filter between the imaging array and an image to be imaged; whereby
    light transmitted to the imaging array is filtered by said light-frequency strip filter according to a sequence effected by said modulator to effect an image by the imaging array.

12. A modulated light filter system as set forth in claim 11, wherein said first geometrical pattern is selected from the group consisting of:

rows, lines, and columns.

13. A modulated light filter system as set forth in claim 11, wherein said light-frequency strip filter is a red-green-blue (RGB) strip filter.

14. A modulated light filter system as set forth in claim 13, wherein said red-green-blue (RGB) strip filter having strips of green filter adjacent strips of red filter and strips of blue filter, said strips being in width the same as active imaging elements of the imaging array.

15. A modulated light filter system as set forth in claim 11, wherein said modulator further comprises:

first and second comb drives coupled to said light-frequency strip filter so that said first and second comb drives operate in opposite directions;

a spring suspension system, said spring suspension system coupled to a periphery of said light-frequency strip filter, said spring suspension system retaining said light-frequency strip filter in a central location subject to offset or excursion by said first and second comb drives.

16. A modulated light filter system as set forth in claim 11, further comprising:

said modulator modulating said light-frequency strip filter to present each different type of light frequency filtered by said filter elements to an imaging element during an interval in which the visual imaging array constructs a frame of visual imaging.

17. A modulated light filter system as set forth in claim 16, further comprising:

said light-frequency strip filter comprising a red-green-blue (RGB) color strip filter.

18. A modulated chromatic filter system for providing color separation in a visual imaging array, comprising:

a red-green-blue (RGB) color strip filter, said RGB strip filter having parallel strips of red, green, and blue filter elements arranged in rows corresponding with rows of the visual imaging array, said RGB strip filter having strips of green filter adjacent strips of red filter and strips of blue filter, said strips being in width approximately the same as said rows of the visual imaging array; and a modulator, said modulator modulating said RGB strip filter between the visual imaging array and an image to be imaged, said modulator having first and second comb drives, said first comb drive coupled to said RGB strip filter, said second comb drive coupled to said RGB strip filter so that said first and second comb drives operate in opposite directions, said modulator also having a spring suspension system, said spring suspension system coupled to a periphery of said RGB strip filter, said spring suspension system retaining said RGB strip filter in a central location subject to offset or excursion by said first and second comb drives;

said modulator modulating said RGB strip filter three or more times as fast as a time interval in which the visual imaging array constructs a frame of visual imaging; whereby light transmitted to the visual imaging array is filtered by said RGB strip filter according to a sequence effected by said modulator to effect a color image by the visual imaging array and to provide an efficient, lightweight and robust means of providing RGB encoding of imaged data with reduced loss of pixel resolution.

* * * * *